(12) United States Patent
Yoshimoto (10) Patent No.: US 9,878,364 B2
(45) Date of Patent: Jan. 30, 2018

(54) WORKPIECE LOADING APPARATUS

(71) Applicant: HITACHI ZOSEN FUKUI CORPORATION, Awara-shi, Fukui (JP)

(72) Inventor: Takaaki Yoshimoto, Awara (JP)

(73) Assignee: HITACHI ZOSEN FUKUI CORPORATION, Awara-shi, Fukui (JP)

( * ) Notice: Subject to any disclaimer, the term of this patent is extended or adjusted under 35 U.S.C. 154(b) by 161 days.

(21) Appl. No.: 14/778,334

(22) PCT Filed: Jan. 31, 2014

(86) PCT No.: PCT/JP2014/000535
§ 371 (c)(1),
(2) Date: Sep. 18, 2015

(87) PCT Pub. No.: WO2014/147937
PCT Pub. Date: Sep. 25, 2014

(65) Prior Publication Data
US 2016/0271678 A1    Sep. 22, 2016

(30) Foreign Application Priority Data

Mar. 22, 2013 (JP) ................................ 2013-061024

(51) Int. Cl.
*B21D 43/18* (2006.01)
*B21D 43/04* (2006.01)
(Continued)

(52) U.S. Cl.
CPC ............ *B21D 43/18* (2013.01); *B21D 43/04* (2013.01); *B25J 9/107* (2013.01); *B25J 15/0061* (2013.01);
(Continued)

(58) Field of Classification Search
CPC ........ B21D 43/18; B21D 43/04; B65G 47/91; B65G 47/917; B25J 9/107; B25J 15/0616; B25J 15/0061
See application file for complete search history.

(56) References Cited

FOREIGN PATENT DOCUMENTS

| JP | S64-062230 A | | 3/1989 |
|---|---|---|---|
| JP | s64062230 A | * | 3/1989 |

(Continued)

OTHER PUBLICATIONS

International Search Report of PCT/JP2014/000535.

*Primary Examiner* — Michael S Lowe
(74) *Attorney, Agent, or Firm* — Muncy, Geissler, Olds & Lowe, P.C.

(57) ABSTRACT

The workpiece loading apparatus (100) allows efficient loading of a workpiece and also allows a reduction in load weight at the time of workpiece loading by adjusting intervals between suction sections.

The present invention is directed to a workpiece loading apparatus (100) for loading, into a press (10), a workpiece W that is conveyed, including: a sheet loader (20) attached to the press (10), a suction unit (30) supported by the arms (21) of the sheet loader (20) and including a plurality of suction sections (31), and an interval adjustment device (40) that is independent of and separate from the sheet loader (20) and that is able to be coupled to the suction unit (30), wherein: the suction unit (30) is able to be coupled to a coupling section (41) of the interval adjustment device (40) by the sheet loader (20) guiding the suction unit (30) to the interval adjustment device (40), and the interval adjustment device (40) is able to adjust intervals between the suction sections (31) of the suction unit (30) coupled to the coupling section (41).

6 Claims, 7 Drawing Sheets

(51) Int. Cl.
  *B25J 9/10*    (2006.01)
  *B25J 15/00*   (2006.01)
  *B25J 15/06*   (2006.01)
  *B65G 47/91*   (2006.01)

(52) U.S. Cl.
  CPC .......... *B25J 15/0616* (2013.01); *B65G 47/91* (2013.01); *B65G 47/917* (2013.01)

(56) References Cited

FOREIGN PATENT DOCUMENTS

| | | | |
|---|---|---|---|
| JP | 02298487 A | * | 12/1990 |
| JP | H02-298487 A | | 12/1990 |
| JP | H03-122069 U | | 12/1991 |
| JP | H09-327734 A | | 12/1997 |
| JP | H11-300441 A | | 11/1999 |
| JP | 2006-346699 A | | 12/2006 |
| JP | 2006346699 A | * | 12/2006 |

* cited by examiner

Advantageous Effects of Invention

The work loading apparatus of the present invention makes it possible to, by disposing the plurality of suction sections in the suction unit and adjusting the intervals between the suction sections, both greatly ease the limitations on the sizes and shapes of workpieces that can be loaded and simultaneously convey a plurality of workpieces.

In a case where the suction sections are each independently movable in this work loading apparatus, the intervals can be easily adjusted.

Further, the suction sections can be disposed in an optimum position for sucking and holding a workpiece. This enables efficient loading of a workpiece.

By providing the interval adjustment device separately from the sheet loader, the workpiece loading apparatus of the present invention also allows a reduction in load weight at the time of workpiece loading.

In addition to this, since the sheet loader can guide the suction unit to the interval adjustment device, the suction unit can be easily coupled to the coupling section of the interval adjustment device without the need to detach the suction unit from the sheet loader.

It is preferable that the interval adjustment device be placed parallel to a side of the press that faces the sheet loader.

In this case, the loading of the workpiece toward the press by the sheet loader and the guidance of the suction unit toward the interval adjustment device on the side opposite to the press can be smoothly performed.

Further, in a case where the interval adjustment device includes a coupling section and a leg section supporting the coupling section and the coupling section is placed above a conveyor that conveys the workpiece, the suction unit is easily guided to the interval adjustment device.

In a case where the suction unit of the workpiece loading apparatus of the present invention is supported by a pair of right and left arms of the sheet loader, it becomes possible to support even a heavy workpiece W and load the workpiece at a higher speed.

DESCRIPTION OF EMBODIMENTS

A preferred embodiment of the present invention is described in detail below with reference to the drawings as needed. In the drawings, the same components are given the same reference signs, and repetition of the same descriptions is omitted.

Further, unless otherwise noted, positional relationships such as top and bottom, left and right are based on those shown in the drawings.

Furthermore, the dimensional ratios of the drawings are not limited to those shown in the drawings.

A workpiece loading apparatus according to the present embodiment is used as an apparatus for loading a workpiece into a press. The press may be a tandem press line press or a transfer press line press.

Figure 1:
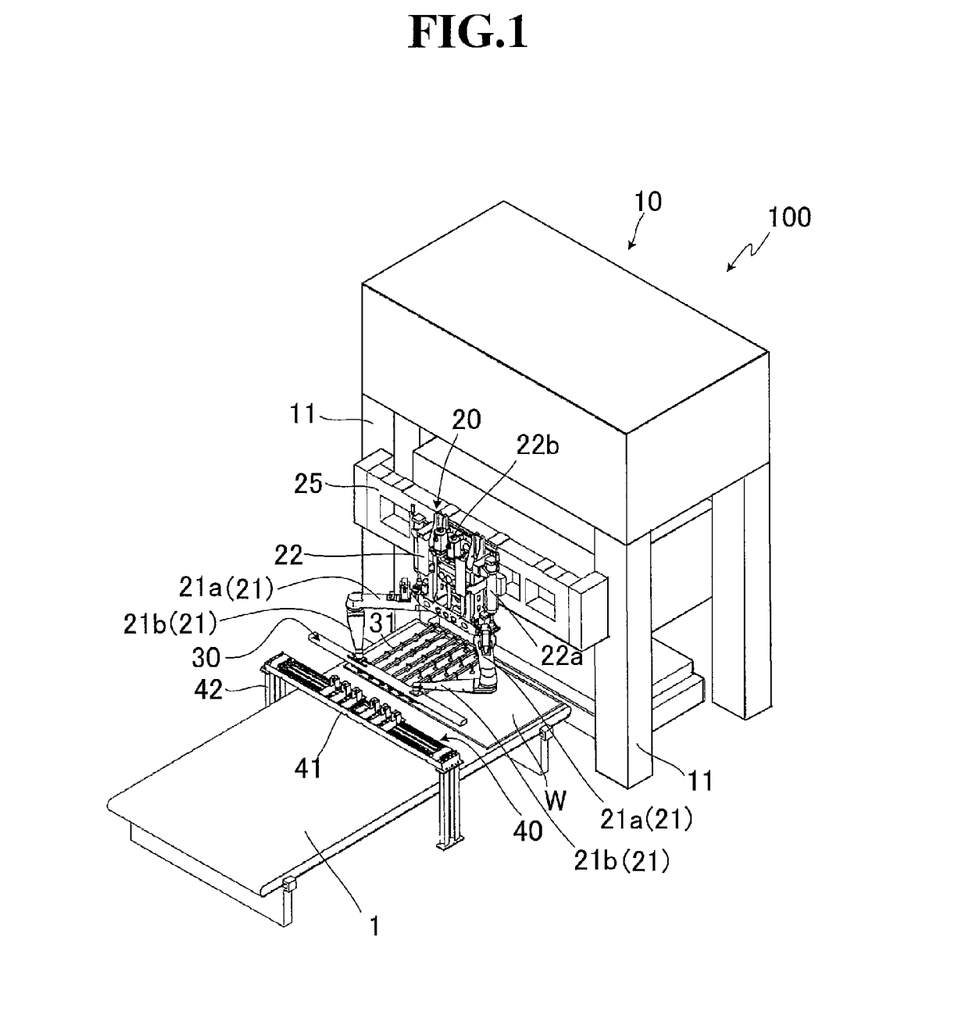
FIG. 1 is a perspective view showing a workpiece loading apparatus according to the present embodiment.

FIG. 1 is a perspective view showing a workpiece loading apparatus according to the present embodiment.

As shown in FIG. 1, a workpiece loading apparatus 100 according to the present embodiment includes: a sheet loader 20 fixed to a press 10, a suction unit 30 supported by the arms 21 of the sheet loader and including a plurality of suction section 31, and an interval adjustment device 40 that is independent of and separate from the sheet loader 20 and that can be coupled to the suction unit 30.

In the workpiece loading apparatus 100, the sheet loader 20 guides the suction unit 30 to the interval adjustment device 40, whereby the suction unit 30 is coupled to a coupling section of the interval adjustment device 40.

Then, the interval adjustment device 40 adjusts intervals between the suction sections 31 of the suction unit 30 so that the suction sections 31 optimally conform to the position, shape, and size of a workpiece W.

Then, the workpiece W is conveyed by a conveyor 1, sucked and held by the suction sections 31, and driven by the sheet loader 20 to be loaded into the press 10.

The work loading apparatus 100 according to the present embodiment makes it possible to, by disposing the plurality of suction sections 31 in the suction unit 30 and adjusting the intervals between the suction sections 31, both greatly ease the limitations on the sizes and shapes of workpieces W that can be loaded and simultaneously convey a plurality of workpieces W.

Further, the suction sections 31 can be disposed in an optimum position for sucking and holding a workpiece W. This allows efficient loading of a workpiece W.

Furthermore, by providing the interval adjustment device 40 separately from the sheet loader 20, the load weight on the sheet loader 20 at the time of loading of a workpiece W can also be reduced.

The present embodiment is described in more detail below.

In the workpiece loading apparatus 100 according to the present embodiment, the sheet loader 20 includes a body section 22 and a pair of right and left arms 21 connected to the body section 22.

Attached to the press 10 is a fixing bar 25 configured to cross-link a pair of uprights 11. The body section 22 of the sheet loader 20 is attached to substantially the center of the fixing bar 25.

That is, the sheet loader 20 is attached to the press 10 via the body section 22.

The body section 22 is configured such that the height of the body section 22 can be adjusted upward and downward according to the thickness of the workpiece W, the shape of a die, etc. and the position of the body section 22 can be adjusted rightward and leftward according to the position, shape, etc. of the workpiece W.

The body section 22 has ball screws 22a and motors 22b attached on both sides thereof. The motors 22b are configured to drive the ball screws.

This enables the pair of right and left arms 21 and the body section 22 to be moved by the ball screws 22a and the motors 22b upward and downward w respect to the fixing bar 25.

The pair of right and left arms 21 are symmetrically structured.

The left arm 21 includes an upper arm section 21a pivotally attached to the body section 22 and a lower arm section 21b pivotally attached to the upper arm section 21a.

Moreover, the upper arm section 21a and the lower arm section 21b are both horizontally rotatable.

The right arm 21 has the same structure as that described above.

The lower arm sections 21b of the pair of right and left arms 21 have their leading ends pivotally attached to the suction unit 30. That is, the suction unit 30 is supported by the two arms.

This makes it possible to dispersedly support the weight of even a comparatively heavy workpiece W and load the workpiece W at a high speed.

The sheet loader 20 lifts up or lowers the workpiece W by moving the pair of right and left arms 21 upward or downward.

Further, by rotating the upper and lower arm sections 21a and 21b of the pair of right and left arms 21, the workpiece W is conveyed in a horizontal direction via the suction unit 30 attached to the leading ends.

Therefore, for example, the workpiece W can also be diagonally conveyed via the suction unit 30 by rotating the upper and lower arm sections 21a and 21b of the arms 21 while moving the arms 21 upward and downward.

Further, by rotating the upper and lower arm sections 21a and 21b of the pair of right and left arms 21, the sheet loader 20 can guide the suction unit 30 attached to the leading ends to the after-mentioned interval adjustment device 40.

It should be noted here that upward and downward movements and horizontal rotation of the pair of right and left arms 21 can be achieved by a publicly-known method based on a set computer program.

Figure 2:
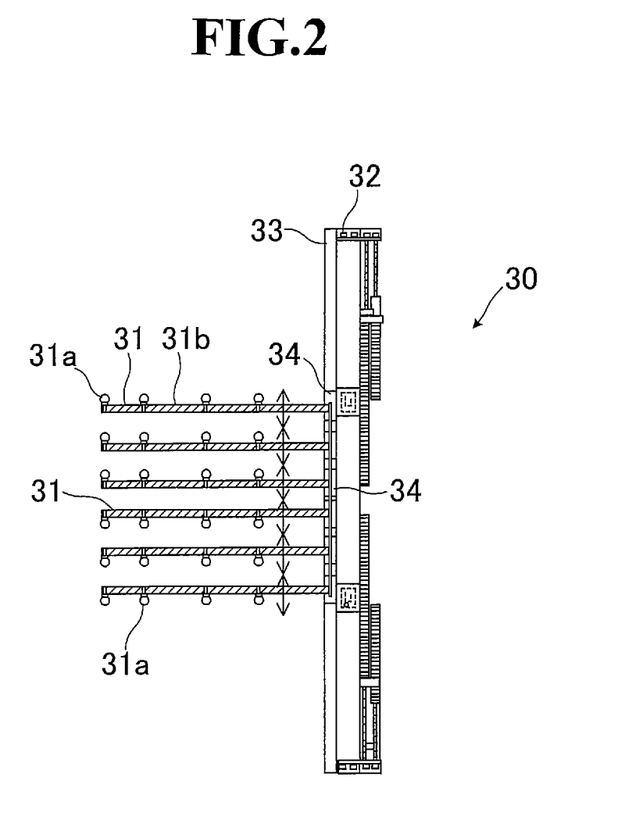
FIG. 2 is a top view showing a suction unit of the workpiece loading apparatus according to the present embodiment.

FIG. 2 is a top view showing the suction unit of the workpiece loading apparatus according to the present embodiment.

In FIG. 2, hatching is partially added for the convenience of facilitating visualization.

As shown in FIG. 2, the suction unit 30 of the work loading apparatus 100 according to the present embodiment includes a crossbar 32 to which the pair of right and left arms (not illustrated) are attached, a guide rail 33 fixed to the crossbar 32, a plurality guide blocks 34 attached to be movable on the guide rail 33, and a plurality of suction sections 31 attached to the guide blocks 34 via stages (not illustrated), respectively.

Further, each of the suction sections 31 includes a supporting rod 31b and a plurality of suction cups 31a attached to the supporting rod 31b. That is, the supporting rods 31b and the guide blocks 34 are attached in one-to-one correspondence with each other.

Making pressure inside the suction cups 31a negative enables the suction cups 31 to suck and hold a flat part of the workpiece W.

The plurality of suction sections 31 are combined with the corresponding guide blocks 34, respectively, to be each independently movable along the guide rail 33 (in a longitudinal direction of the crossbar 32). A mechanism by which the suction section 31 move will be described later.

With continued reference to FIG. 1, the interval adjustment device 40 of the workpiece loading apparatus 100 according to the present embodiment is a device configured to adjust the intervals between the suction sections 31 of the suction unit 30, and includes driving devices configured to move the suction sections 31 in adjusting the intervals.

The interval adjustment device 40 is independent of and separate from the sheet loader 20, and is placed parallel to a side of the press 10 that faces the sheet loader 20. For this reason, the interval adjustment device 40, which is comparatively heavy in weight, is not attached to the sheet loader 20 in loading the workpiece W with the sheet loader 20. This allows a reduction in load in weight on the sheet loader 20.

Further, the guidance of the suction unit 30 toward the interval adjustment device 40 on the side opposite to the press 10, as well as the loading of the workpiece W toward the press 10 by the sheet loader 20, can be smoothly performed.

Conventionally, an attempt to move each separate suction section requires driving mechanisms (interval adjustment devices) such as motors for moving each separate suction section. This attempt has been avoided, as it undesirably causes an increase in load weight on the apparatus.

The interval adjustment device 40 includes a coupling section 41 that can be coupled to the suction unit 30 and a leg section 42 supporting the coupling section 41.

The coupling section 41 is placed above the conveyor 1 that conveys the workpiece W. For this reason, the operation in which the sheet loader 20 loads the workpiece W and the operation in which the suction unit 30 is guided to the interval adjustment device 40 occur in the same direction. This makes it easy to configure the settings for the operations and also makes it possible to shorten the amount of time required for the operations. The leg section 42 is formed in a U-shape in a side view to straddle the conveyor 1 and therefore does not hinder the conveyance of the workpiece W by the conveyor 1.

Figure 3:
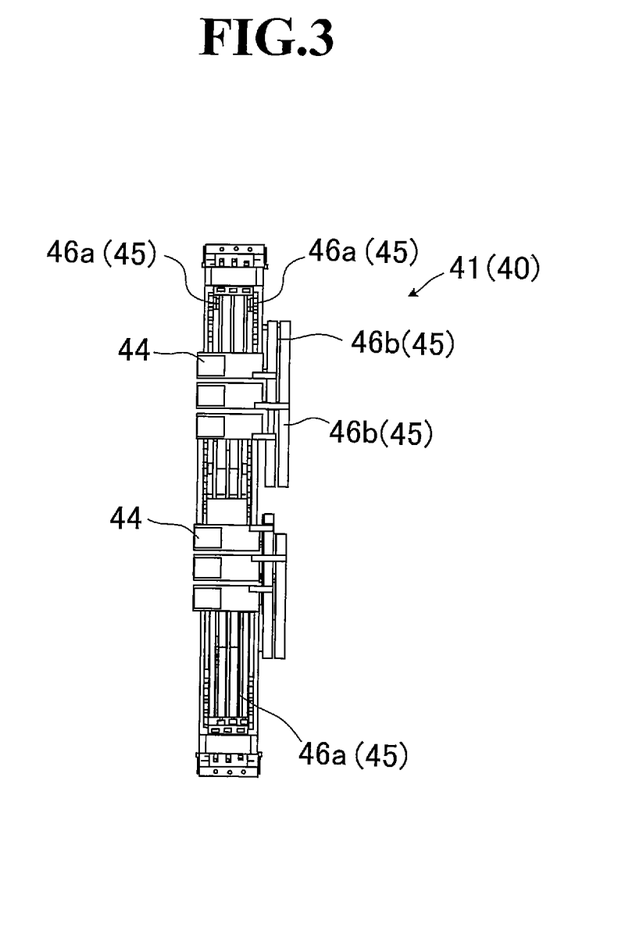
FIG. 3 is a top view showing an interval adjustment device of the workpiece loading apparatus according to the present embodiment.

FIG. 3 is a top view showing the interval adjustment device of the workpiece loading apparatus according to the present embodiment.

As shown in FIG. 3, the coupling section 41 of the interval adjustment device 40 includes a plurality of positioning units 44 and driving devices 45 respectively attached to the positioning units 44.

Further, each of the driving devices 45 includes a ball screw 46a attached to the corresponding positioning unit 44 and a motor 46b configured to drive the ball screw.

The interval adjustment device 40 is configured such that each of the driving devices 45 drives the corresponding positioning unit 44 to move along the ball screw.

Therefore, since, as mentioned above, the suction sections 31 are attached to each separate positioning unit 44 via the guide blocks 34, each of the suction sections 31 moves at the same time as the corresponding positioning unit moves.

Figure 4A:
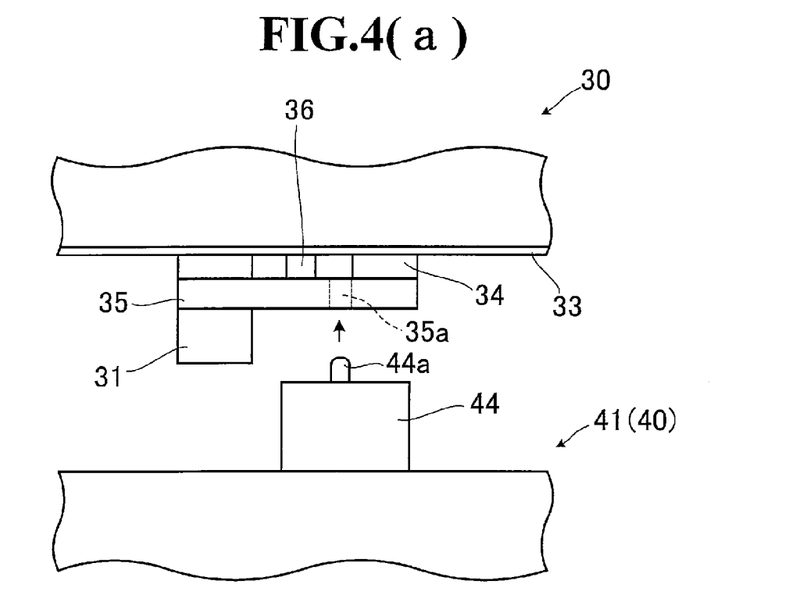
FIG. 4(a) is a partial side view schematically showing how each suction section of the suction unit of the workpiece loading apparatus according to the present embodiment and each positioning unit of the interval adjustment device look before they are coupled to each other.
Figure 4B:
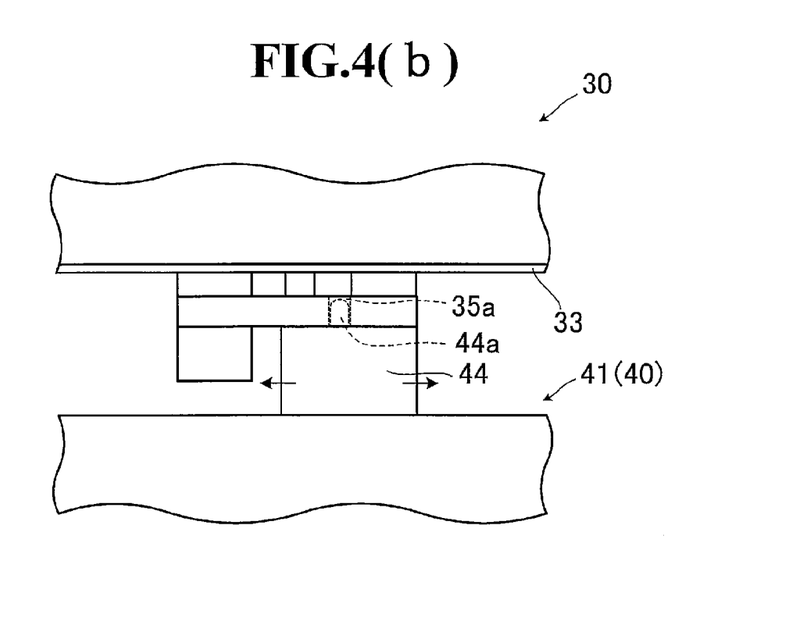
FIG. 4(b) is a partial side view schematically showing how each suction section of the suction unit of the workpiece loading apparatus according to the present embodiment and each positioning unit of the interval adjustment device look after they have been coupled to each other.

FIG. 4(a) is a partial side view schematically showing how each suction section of the suction unit of the workpiece loading apparatus according to the present embodiment and each positioning unit of the interval adjustment device look before they are coupled to each other. FIG. 4(b) is a partial side view schematically showing how each suction section of the suction unit of the workpiece loading apparatus according to the present embodiment and each positioning unit of the interval adjustment device look after they have been coupled to each other.

As shown in FIG. 4(a), each of the suction sections 31 of the suction unit 30 is attached to a stage 35 supported by the corresponding guide block 34, which moves on the guide rail 33, and each of the stages 35 is provided with a pinhole 35a.

Meanwhile, each of the positioning units 44 of the coupling section 41 of the interval adjustment device 40 is provided with a pin 44a.

Then, when the suction unit 30 is guided by the sheet loader 20 to be coupled to the coupling section 41 of the interval adjustment device 40, the pins 44a of the positioning units 44 are fitted into the pinholes 35a of the stages 35. This causes the suction unit 30 to be coupled to the coupling section 41 of the interval adjustment device 40 as shown in FIG. 4(b).

Since the suction sections 31 of the suction unit 30 are thus fixed to each separate positioning unit 40, each of the suction sections 31 moves along the guide rail 33 at the same time as the corresponding positioning unit 40 moves along the ball screw.

It should be noted here that the suction sections 31 attached to the suction unit 30 each independently have the same structure. That is, for example, the interval between adjacent suction sections 31 can be adjusted by moving the suction sections 31 in different directions.

This in turn makes it possible to easily adjust the intervals between the suction section 31 during a so-called setup time when there are changes in size, shape, number, etc, of workpieces to be loaded.

The suction unit 30 includes a brake 36, attached to each of the stages 35, which can grasp the guide rail 33. That is, after interval adjustment, each of the suction sections 31 can be stopped at a desired position by using the brake 36 to grasp the guide rail 33 to clamp the guide rail 33. The clamping by the brake 36 is released when a proximity switch detects a coupling of the aforementioned suction unit 30 to the coupling section 41 of the interval adjustment device 40.

Each of the positioning units 44 has a landing detecting sensor (not illustrated) provided on an upper surface thereof. This makes it possible to find in advance a failure of any of the stages 35 of the suction unit 30 to be fitted onto the upper surface of the corresponding positioning unit 44.

After the intervals between the suction sections 31 have been adjusted, the guidance by the sheet loader 20 causes the pins 44a of the positioning units 44 to be detached from pinholes 35a of the stages 35, thus causing the suction unit 30 to be detached from the coupling section 41 of the interval adjustment device 40.

The following describes how the workpiece loading apparatus 100 according to the present embodiment operates.

Figure 5A:
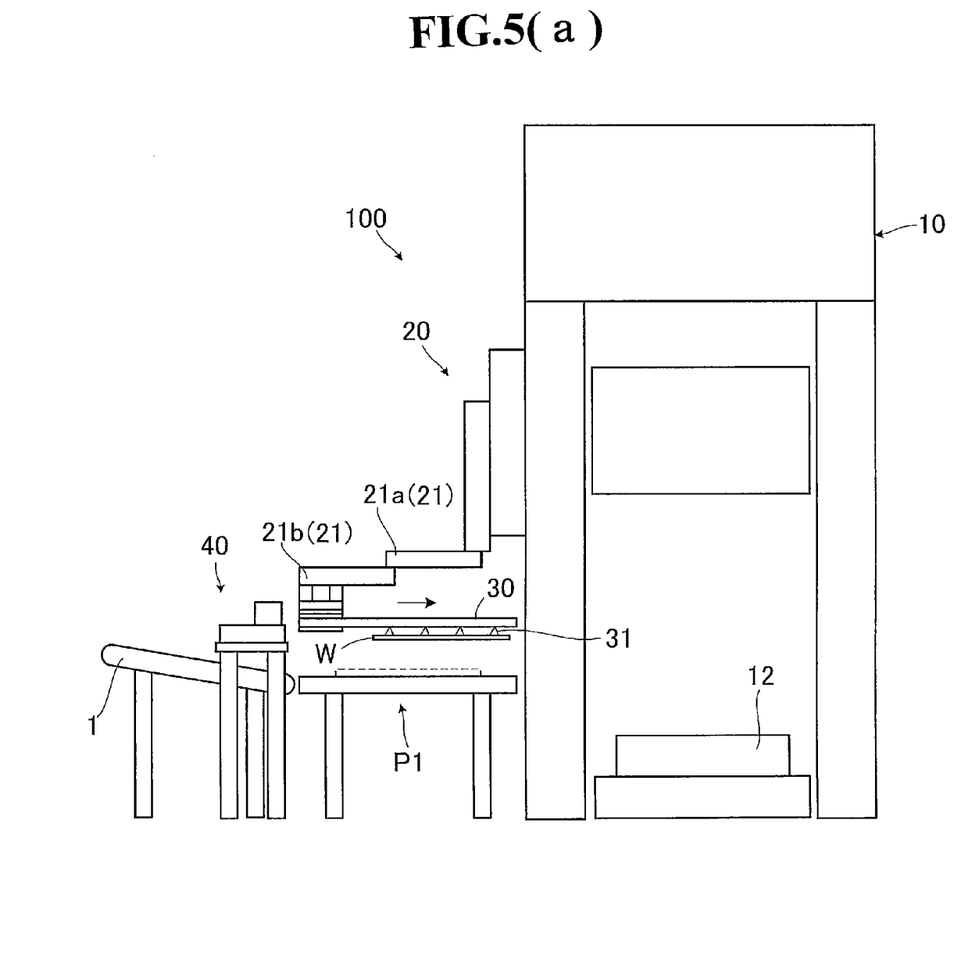
FIG. 5(a) is a side view schematically showing how the workpiece loading apparatus according to the present embodiment looks before it loads a workpiece by sucking and holding the workpiece.
Figure 5B:
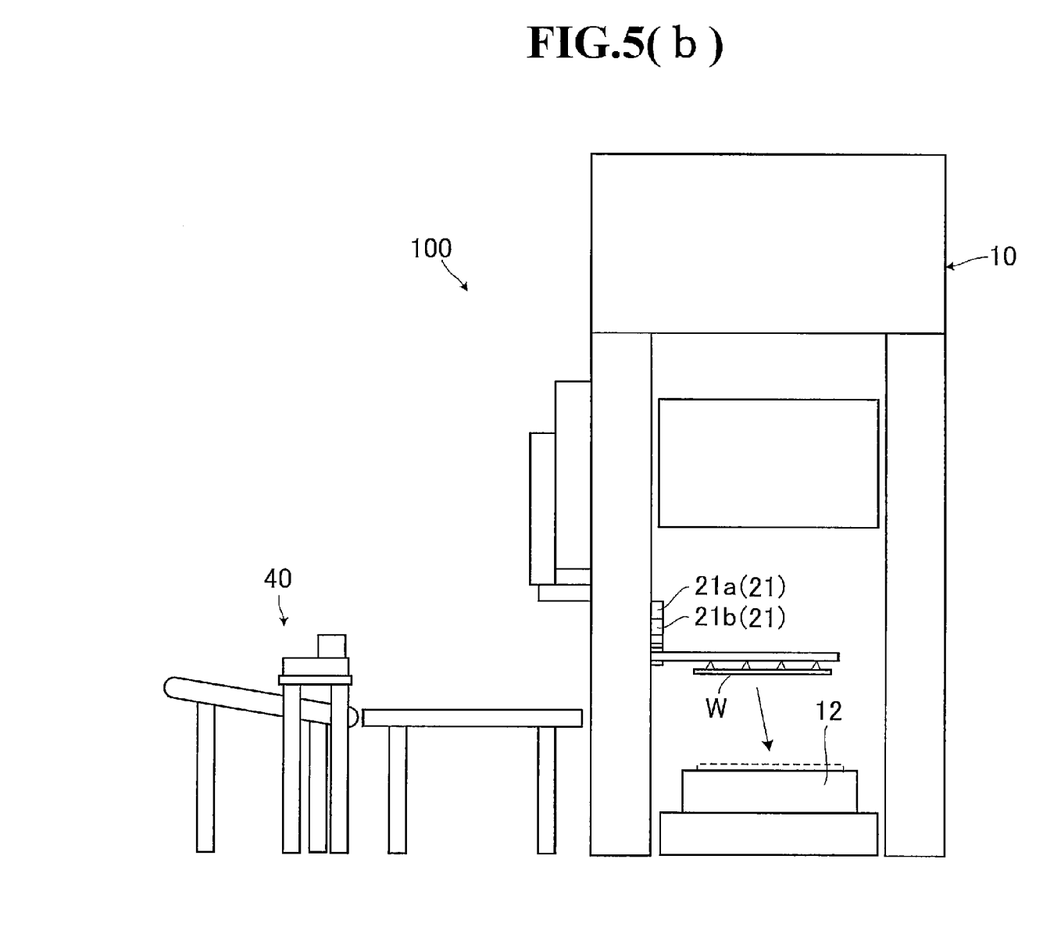
FIG. 5(b) is a side view schematically showing how the workpiece loading apparatus according to the present embodiment looks after it has loaded the workpiece by sucking and holding the workpiece.

FIG. 5(a) is a side view schematically showing how the workpiece loading apparatus according to the present embodiment looks before it loads a workpiece by sucking and holding the workpiece. FIG. 5(b) is a side view schematically showing how the workpiece loading apparatus according to the present embodiment looks after it has loaded the workpiece by sucking and holding the workpiece.

In the workpiece loading apparatus 100, a workpiece W conveyed by the conveyor 1 is sucked and held at a predetermined position P1 by the suction sections 31. At this point in time, the arms 21 of the sheet loader 20 have moved to a lower position.

First, the arms 21 move upward to lift up the workpiece W as shown in FIG. 5(a). Then, the upper and lower arm sections 21a and 21b of the arms 21 rotate to convey the workpiece W in a horizontal direction, whereby the workpiece W is loaded into the press 10.

Next, the arms 21 move downward to mount the workpiece on a die 12 of the press 10 as shown in FIG. 5(b).

Then, the workpiece W mounted on the die 12 is subjected to press working by the press. At this point in time, the arms 21, which have mounted the workpiece W on the die 12, move upward and the upper and lower arm sections 21a and 21b horizontally rotate so that the arms 21 withdraw from the press. After that, the arms 21 move downward and the upper and lower arm sections 21a and 21b horizontally rotate so that the arms 21 goes for the next workpiece W to be conveyed.

Repetition of this operation allows continuous loading of workpieces W. The upward and downward movements of the arms 21 and the horizontal rotation of the upper and lower arm sections 21a and 21b may occur at the same time, although they have been separately described.

Figure 6:
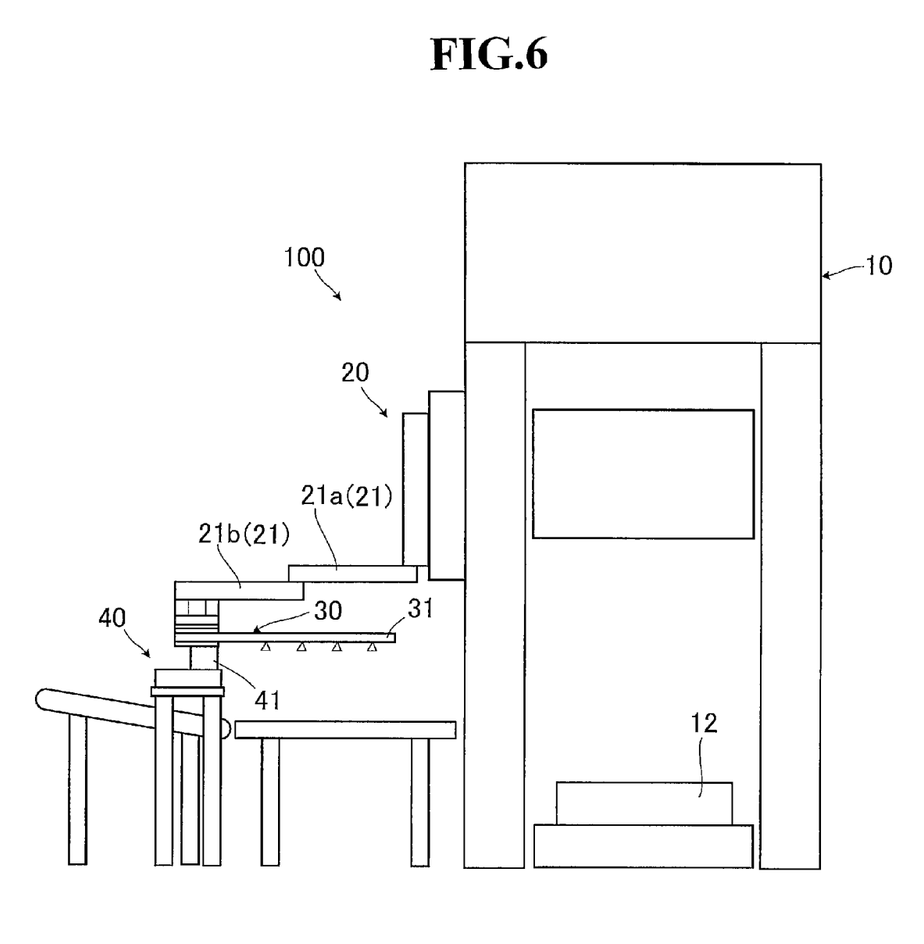
FIG. 6 is a side view schematically showing how the workpiece loading apparatus according to the present embodiment looks after a sheet loader of the workpiece loading apparatus has guided the suction unit to the interval adjustment device.

FIG. 6 is a side view schematically showing how the workpiece loading apparatus according to the present embodiment looks after the sheet loader of the workpiece loading apparatus has guided the suction unit to the interval adjustment device.

In the workpiece loading apparatus 100, the sheet loader 20 rotates the upper and lower arm sections 21a and 21b of the arms 21 to guide the suction unit 30 in a horizontal direction, and as shown in FIG. 6, the suction unit 30 is coupled to the coupling section 41 of the interval adjustment device 40. Since the sheet loader 20 thus guides the suction unit 30 to the interval adjustment device 40, the suction unit 30 can be easily coupled to the coupling section 41 of the interval adjustment device 40 without the need to detach the suction unit 30 from the sheet loader 20.

Once the suction unit 30 is thus coupled to the coupling section 41 of the interval adjustment device 40, the interval adjustment device 40 adjusts the intervals between the suction sections 31.

Thus, in the workpiece loading apparatus 100 according to the present embodiment, the interval adjustment device 40 can adjust the intervals between the suction sections 31 on the basis of the size, shape, and number of workpieces to be loaded (see FIG. 6), and since the interval adjustment device 40 is separate from the sheet loader 20, the load weight on the sheet loader 20 at the time of loading of a workpiece W can be reduced (see FIGS. 5(a) and 5(b)).

After the intervals between the suction sections 31 have been adjusted, the guidance by the sheet loader 20 causes the suction unit 30 to be detached from the coupling section 41 of the interval adjustment device 40. This makes it possible to load a workpiece with the suction unit 30 in which the intervals between the suction sections 31 have been adjusted.

The foregoing has described a preferred embodiment of the present invention. However, the present invention is not limited to the embodiment described above.

For example, while, in the workpiece loading apparatus 100 according to the present embodiment, a workpiece W that is conveyed by the conveyor 1 is loaded into the press 10, the workpiece W may be conveyed by any means other than the conveyor 1.

In the workpiece loading apparatus 100, the ball screws 22a and motors 22b attached to the body section 22 enables the arms 21 to move upward and downward. Alternatively, any means other than the ball screws 22a and the motors 22b, such as air cylinders, linear motors, and rack-and-pinion mechanisms, may be employed to enable the arms 21 to move upward and downward.

While, in the workpiece loading apparatus 100, each of the suction sections 31 includes a supporting rod 31b and a plurality of suction cups 31a attached to the supporting rod 31b, the suction cups 31a may be replaced by grippers.

In the workpiece loading apparatus 100, the interval adjustment device 40 includes a coupling section 41 that can be coupled to the suction unit 30 and a leg section 12 supporting the coupling section 41. However, the interval adjustment device 40 is not limited to this configuration. For example, the interval adjustment device 40 may have a ceiling-hung structure.

In the workpiece loading apparatus 100, the coupling section 41 of the interval adjustment device 40 includes a plurality of positioning units 44 and driving devices 45 respectively attached to the positioning units 44. However, the coupling section 41 is not limited to this configuration.

Further, while each of the driving devices 45 includes a ball screw 46a attached to the corresponding positioning unit 44 and a motor 46b configured to drive the ball screw, the ball screw may be replaced, for example, by an air cylinder, a liner motor, or a rack-and-pinion mechanism.

In the workpiece loading apparatus 100, the suction unit 30 and the coupling section 41 of the interval adjustment device 40 are coupled to each other by the pins 44a of the positioning units 14 being fitted into the pinholes 35a of the stages 35. However, this configuration does not impose any limitation.

For example, the suction unit 30 and the coupling section 41 may be coupled to each other by a clamping device.

In the workpiece loading apparatus 100, the movement of each of the positioning units 44 is stopped by causing the brake 36 to grasp the guide rail 33. However, this configuration does not impose any limitation.

Further, the landing detecting sensor provided on the upper surface of each of the positioning units 44 is not necessarily a required component.

In the workpiece loading apparatus 100, the suction unit 30 may be attachable to and detachable from the arms of the sheet loader.

INDUSTRIAL APPLICABILITY

A workpiece loading apparatus of the present invention is used as an apparatus for loading a workpiece into a press. By adjusting intervals between suction sections, the workpiece loading apparatus of the present invention allows efficient loading of a workpiece and also allows a reduction in load weight at the time of workpiece loading.

REFERENCE SIGNS LIST

1 . . . conveyor
10 . . . press
11 . . . upright
20 . . . sheet loader
21 . . . arm
21a . . . upper arm section
21b . . . lower arm section
22 . . . body section
22a . . . ball screw
22b . . . motor
25 . . . fixing bar
30 . . . suction unit
31 . . . suction section
31a . . . suction cup
31b . . . supporting rod
32 . . . crossbar
33 . . . guide rail
34 . . . guide block
35 . . . stage
35a . . . pinhole
36 . . . brake
40 . . . interval adjustment device
41 . . . coupling section
42 . . . leg section
44 . . . positioning unit
44a . . . pin
45 . . . driving device
100 . . . workpiece loading apparatus
W . . . workpiece

The invention claimed is:

1. A workpiece loading apparatus for loading, into a press, a workpiece that is loaded and carried in a carrying direction by a conveyor, comprising:
　a sheet loader attached to the press, including arms, each of which has a joint such that the arms are able to extend and contract,
　a suction unit supported by the arms of the sheet loader and including a plurality of suction sections, and
　an interval adjustment device that is independent of and separate from the sheet loader and that is able to be coupled to the suction unit, wherein:
　the interval adjustment device is configured with
　　a coupling section that is placed above the conveyor and
　　a leg section that supports the coupling section,
　　the suction unit is able to be coupled to the coupling section of the interval adjustment device by the sheet loader guiding the suction unit to the interval adjustment device, and
　the interval adjustment device is able to adjust intervals between the suction sections of the suction unit coupled to the coupling section, and
　a first direction in which the sheet loader loads the workpiece and a second direction in which the sheet loader guides the suction unit to the interval adjustment device are parallel to the carrying direction, and
　the first direction is opposite to the second direction.

2. The workpiece loading apparatus according to claim 1, wherein
　the arms of the sheet loader by which the suction unit is supported are a pair of right and left arms.

3. The workpiece loading apparatus according to claim 1, wherein
　the interval adjustment device is placed parallel to a side of the press that faces the sheet loader.

4. The workpiece loading apparatus according to claim 1, wherein
　the suction sections are each independently movable.

5. The workpiece loading apparatus according to claim 1, wherein:
　the suction unit includes a guide rail, a plurality of guide blocks attached to be movable on the guide rail, and the suction sections, the suction sections being respectively attached to the guide blocks, the coupling section of the interval adjustment device includes a plurality of positioning units to be respectively coupled to the guide blocks and a plurality of driving devices respectively attached to the positioning units, and the driving devices enable the suction sections to each independently move via the positioning units and the guide blocks.

6. The workpiece loading apparatus according to claim 5, wherein:

the suction unit is coupled to the coupling section of the interval adjustment device by the positioning units being provided with pins fitted in pinholes provided in stages attached to the suction sections, and a brake which is able to grasp the guide rail is attached to each of the stages.

* * * * *